United States Patent
Murugan et al.

(10) Patent No.: US 7,596,482 B2
(45) Date of Patent: Sep. 29, 2009

(54) SYSTEM AND METHOD TO ANALYZE AND DETERMINE AMPACITY RISKS ON PCB INTERCONNECTIONS

(75) Inventors: Rajen J. Murugan, Round Rock, TX (US); Sarat Kirshnan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 574 days.

(21) Appl. No.: 11/440,536

(22) Filed: May 25, 2006

(65) Prior Publication Data

US 2007/0276641 A1    Nov. 29, 2007

(51) Int. Cl.
*G06F 17/50* (2006.01)
*G06F 7/60* (2006.01)
*G06F 17/10* (2006.01)

(52) U.S. Cl. .................... 703/14; 703/2; 716/1
(58) Field of Classification Search ............... None
See application file for complete search history.

(56) References Cited

U.S. PATENT DOCUMENTS

| | | | |
|---|---|---|---|
| 5,347,258 A | 9/1994 | Howard et al. | |
| 5,603,847 A | 2/1997 | Howard et al. | |
| 5,708,569 A | 1/1998 | Howard et al. | |
| 5,878,234 A | 3/1999 | Dutkiewicz et al. | |
| 6,154,716 A * | 11/2000 | Lee | 703/2 |
| 6,630,631 B1 | 10/2003 | Dishongh et al. | |
| 7,228,519 B2 * | 6/2007 | Aoki et al. | 716/15 |
| 7,428,477 B1 * | 9/2008 | Phillips et al. | 703/2 |

OTHER PUBLICATIONS

Jun Zhang, Jennifer J. Zhao, "Iterative Solution and Finite Difference Approximations to 3D Microscale Heat Transport Equation" Technical Report 320-01, Department of Computer Science, University of Kentucky, Lexington, KY, 2001. pp. 1-20.*
http://www.flomerics.com/floemc/prod_info.
http://www.ansys.com/assets/brochures/iceboard-11.pdf.

* cited by examiner

*Primary Examiner*—Paul L Rodriguez
*Assistant Examiner*—Dwin M Craig
(74) *Attorney, Agent, or Firm*—Haynes and Boone, LLP

(57) ABSTRACT

Determining ampacity risks in a circuit comprises receiving geometry data of the circuit, initializing boundary conditions, initializing circuit geometry assumptions, modeling the circuit geometry data as a three-dimensional solid, computing non-Fourier heat conduction through the three-dimensional solid model using conjugate gradient numerical analysis with an incomplete Cholesky preconditioner, and generating an output indicative of a location in the three-dimensional solid model where potential thermal damage may occur in response to a predetermined excitation.

18 Claims, 2 Drawing Sheets

SYSTEM AND METHOD TO ANALYZE AND DETERMINE AMPACITY RISKS ON PCB INTERCONNECTIONS

BACKGROUND

The present disclosure relates generally to information handling systems, and more particularly to analyzing and determining ampacity risks on printed circuit board (PCB) interconnections (e.g., vias, DC nets, power rails, etc.).

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In the design and manufacturing process of the IHS, it is important to be able to detect areas of the circuit or system that is prone to certain risks so that corrective steps may be performed to minimize the risks. For example, it is advantageous to be able to determine regions of trace or interconnect ampacity risks on circuit boards so that the circuit trace or interconnect may be redesigned or rerouted. The term "ampacity" is defined as the current in amperes a conductor can carry continuously under the conditions of use without exceeding its temperature rating, i.e. before the conductor fuses.

Prior efforts to achieve this end have been heretofore unsuccessful because it has been challenging to model, simulate, analyze, and validate to laboratory measurements the direct current (DC) and high current and short duration alternating current (AC) transient pulse effects on the ampacity of PCB interconnectivity. Accordingly, it would be desirable to provide for analyzing and determining ampacity risks on PCB interconnections to greatly improve the reliability of the IHS.

SUMMARY

According to one embodiment, a method for determining ampacity risks in a circuit comprises receiving geometry data of the circuit, initializing boundary conditions, initializing circuit geometry assumptions, modeling the circuit geometry data as a three-dimensional solid, computing non-Fourier heat conduction through the three-dimensional solid model using conjugate gradient numerical analysis with an incomplete Cholesky preconditioner, and generating an output indicative of a location in the three-dimensional solid model where potential thermal damage may occur in response to a predetermined excitation.

According to another embodiment, a method for determining ampacity risks in a printed circuit board layout comprises receiving geometry data of the printed circuit board layout, initializing boundary conditions, initializing circuit geometry assumptions, modeling the circuit geometry data as a three-dimensional solid, computing non-Fourier heat conduction through the three-dimensional solid model using conjugate gradient numerical analysis with a preconditioner, determining whether the computation has converged on a solution, and generating an output, in response to convergence on a solution, indicative of a location in the three-dimensional solid model where potential thermal damage may occur in response to a predetermined excitation.

According to another embodiment, a system for determining ampacity risks in a circuit comprises a user interface for selectively receiving geometry data of the circuit, initial boundary conditions, and initial circuit geometry assumptions, a solid modeler operable to model the circuit geometry data as a three-dimensional solid, and means for computing non-Fourier heat conduction through the three-dimensional solid model using conjugate gradient numerical analysis with an incomplete Cholesky preconditioner, and generating an output indicative of a location in the three-dimensional solid model where potential thermal damage may occur in response to a predetermined excitation.

According to another embodiment, a computer-readable medium having encoded thereon a method for determining ampacity risks in a printed circuit board layout, the method comprises receiving geometry data of the printed circuit board layout, initializing boundary conditions, initializing circuit geometry assumptions, modeling the circuit geometry data as a three-dimensional solid, computing non-Fourier heat conduction through the three-dimensional solid model using conjugate gradient numerical analysis with a preconditioner, determining whether the computation has converged on a solution, and generating an output, in response to convergence on a solution, indicative of a location in the three-dimensional solid model where potential thermal damage may occur in response to a predetermined excitation.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
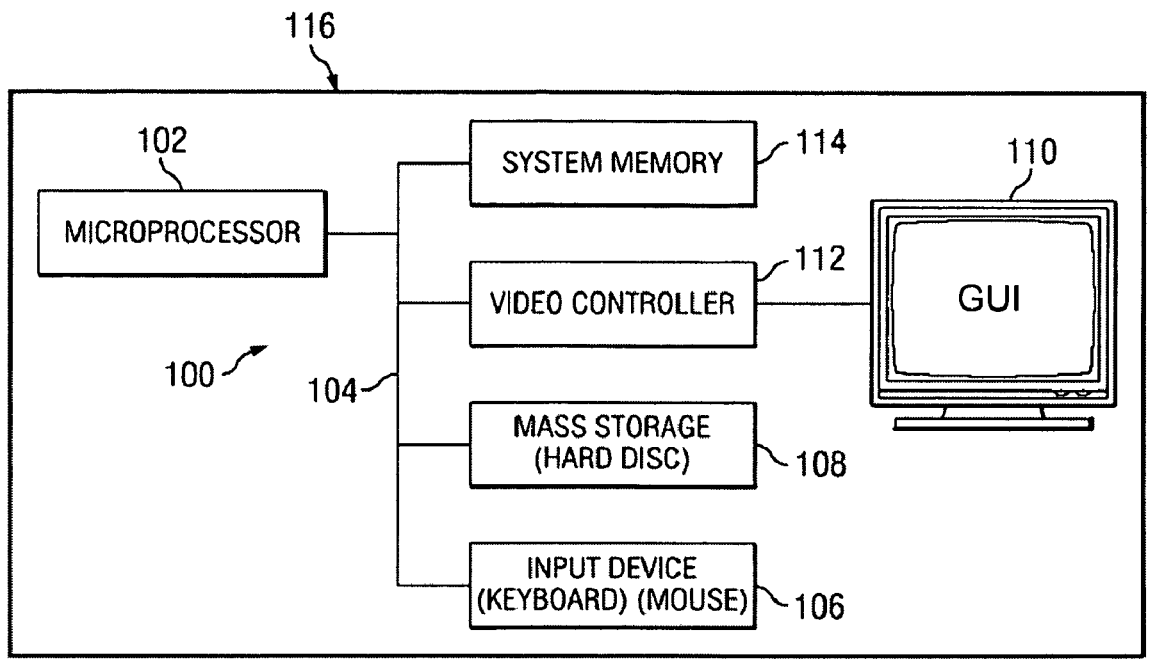
FIG. 1 is a simplified top level block diagram of an embodiment of an IHS.

In one embodiment, IHS 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. IHS system 100 further includes a display (shown having a graphical user interface, GUI, displayed thereon) 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of IHS 100. It should be understood that other buses and intermediate circuits can be deployed between the components described above and microprocessor 102 to facilitate interconnection between the components and the microprocessor.

Figure 2:
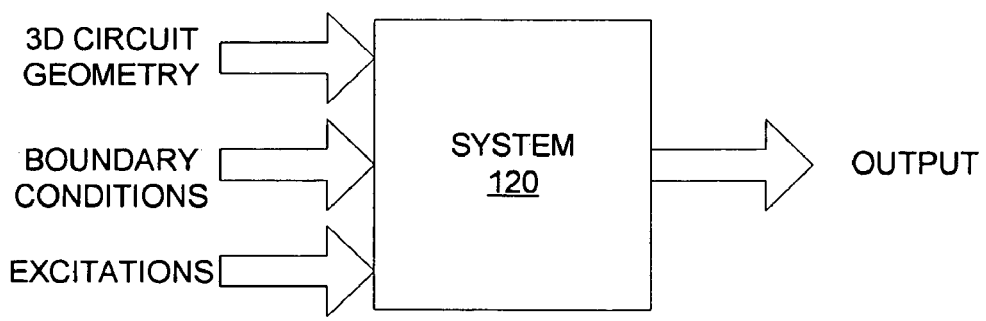
FIG. 2 is a simplified block diagram of a system to analyze and determine ampacity risks in a DC power net.

FIG. 2 is a simplified block diagram of a system 120 to analyze and determine ampacity risks in a dc power net as an example of a PCB interconnectivity. System 120, which may be implemented as an IHS, is operable to receive an input comprising a 3-dimensional (3D) circuit geometry of the electrical circuit being analyzed. Typically, the 3D circuit geometry is a file containing data representing the 3D layout of the circuit from a circuit layout tool. In one embodiment, the circuit layout tool is a printed circuit board (PCB) layout tool, such as ALLEGRO from Cadence Design Systems, and BOARD STATION from Mentor Graphics. The 3D circuit geometry may be that of a multi-layer printed circuit board. Additional inputs to system 120 include assumptions on boundary conditions and assumptions on the 3D circuit geometry. Another input to system 120 is a direct current (DC) or transient (AC) excitation that is simulated as being input into the circuit. A more detailed description of these input parameters are provided below in conjunction with the description of the analysis process. System 120 performs an analysis of the circuit geometry or circuit layout and generates an output that is indicative of locations of potential ampacity risk in the circuit layout. For example, an output plot from system 120 may provide the physical spatial location in the x, y, and z coordinates, (x,y,z), on the x-axis-and the heat dissipation intensity or temperature on the y-axis. The user may use a GUI to select one or more files containing these initial input parameters and assumptions or input other input parameters.

Figure 3:
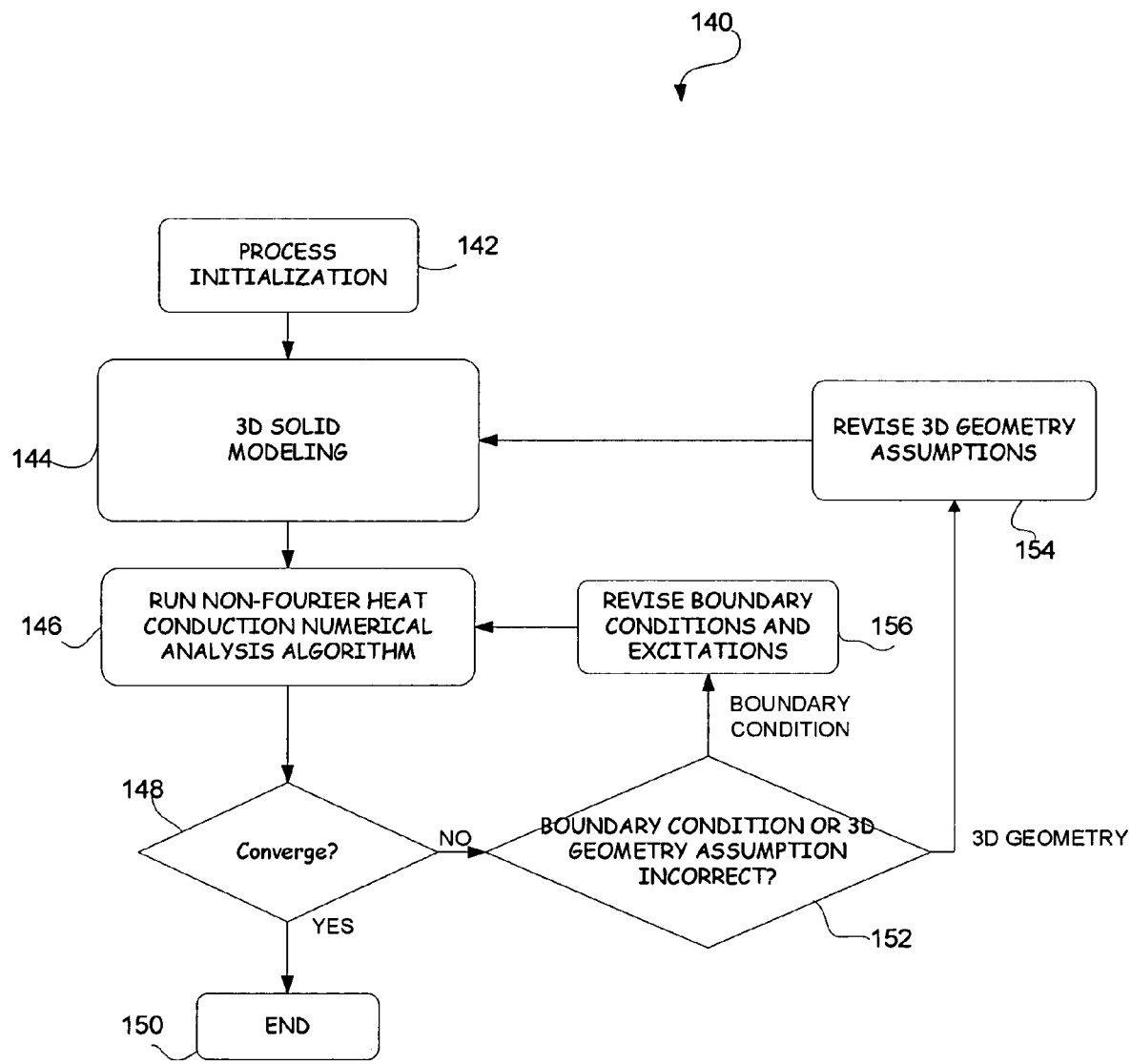
FIG. 3 is a flowchart of an embodiment of a method to analyze and determine ampacity risks on interconnections in a PCB.

FIG. 3 is a flowchart of an embodiment of a method 140 to analyze and determine ampacity risks in a dc power net as an example. Method 140 begins in step 142 with process initialization. Process initialization may include obtaining the input parameters and/or files for the analysis process. As described above, the inputs to the process comprises a 3D circuit geometry such as a file having data representative of a 3D printed circuit board layout. Another input may be a set of assumptions made about the 3D circuit geometry, such as, for example, that an isotropic substrate is used, the vias are isotropic, homogenous and non-hollow, there are no surface roughness, and that the electrical conductivity and resistivity are not a function of temperature. Similarly, assumptions may be made that the circuit geometry is non-homogenous and anisotropic. This may be achieved by treating the variables as temporally and spatially dependent variables. Yet another input to the process is a set of assumptions made about boundary conditions. These assumptions may include, for example, that there are no heat leakage at the circuit boundaries, the external temperature remains constant, the initial temperature at t=0 is the ambient temperature, its derivative anywhere in time is zero, and the temperature profile is symmetric about the z-axis. Certain assumptions may also be made about the excitation input, such as assume that the excitation is impulsive and aperiodic. These assumptions are the initial settings provided as input to the analysis process. Some or all of these initial assumptions are employed to simplify the numerical analysis, but may be altered to further refine or improve the accuracy of the process. These assumptions may also be revised during iterative executions of method 140 in order to arrive at a solution.

In step 144, a 3D solid modeling step is performed to extract data from the 3D circuit geometry input and configure or transform the extracted data into data having a format that is useful for the analysis to be performed in step 146. The 3D solid modeling process in step 144 generates a 3D solid of the circuit traces and interconnects from the 3D circuit geometry input. Examples of commercially available 3D modeling software tools include ALIBRE DESIGN from Alibre, Inc., DESIGNING MODELING from CoCreate Software, Inc., and SOLID EDGE from UGS.

In step 146, a non-Fourier numerical analysis step is performed on heat conduction through the circuit geometry. Heat propagation in isotropic media is usually governed by Fourier's law of heat conduction. However, when the excitation has the profile of high current and short pulse duration, non-Fourier behavior is common. Therefore, a non-Fourier hyperbolic scheme to analyze heat dissipation as a function of high amplitude and short duration transient pulses is used to determine potential high ampacity risk locations in the circuit layout. To arrive at the solution, Equation 2) below is solved numerically using an incomplete Cholesky conjugate gradient (ICCG) method optionally combined with a modified successive over-relaxation scheme (mSOR). As set forth below, Equation 1) is the Fourier's law of heat conduction:

$$Q = KA \frac{\Delta T}{\Delta x}, \qquad 1)$$

where Q is the heat flow, A is the transversal surface area, $\Delta x$ is the thickness of the conductors through which the heat is passing, K is a conductivity constant dependent on the nature of the conductor material and its temperature, and $\Delta T$ is the temperature difference through which the heat is being transferred. Equation 1) is a partial differential equation of parabolic type. Unlike the classical Fourier heat conduction equation represented in Equation 1), Equation 2) is a non-Fourier equation that also describes heat conduction:

$$\tau \frac{\partial^2 T}{\partial t^2} + \frac{\partial T}{\partial t} = \alpha \Delta T \qquad 2)$$

where $\alpha$ is the thermal diffusivity, and $\tau$ is the thermal relaxation time. Unlike the Fourier equation, Equation 2) is a partial differential equation of hyperbolic type.

The non-Fourier numerical analysis of Equation 2) described herein uses incomplete Cholesky conjugate gradient (ICCG) method optionally combined with a modified successive over-relaxation scheme (mSOR) in an iterative process to solve the linear equation:

$$Ax=b, \qquad 3)$$

where x is the solution vector, A is a real, sparse, positive-finite, and symmetric n×n matrix containing data representative of the 3D solid of the circuit layout, and b is a given n-vector of complex n-space. Matrix A is sparse because the number of zero elements therein is sufficiently large. An iterative method is contemplated herein until convergence on a solution is achieved. The conjugate gradient is an iterative method that starts from the residual, $$r_0 = b - Ax_0, \qquad 4)$$

where k is an iteration index, and $X_0$ is an initial estimate for the solution. An orthogonal basis for the Krylov subspace span $\{A^k r_0\}$, for k=0, 1, . . . , is generated by means of three-term recurrence relations. A sequence of symmetric tri-diagonal matrices $\{T_k\}$ is also generated. The resulting symmetric tri-diagonal systems of equations are usually more easily solved than the original problem. A sequence of solution iterates $\{x_k\}$ is thus generated such that the sequence of the norms of the residuals $\{\|r_k\|\}$ converges to a required tolerance.

Incomplete Cholesky is a preconditioner for the iterative conjugate gradient method to achieve faster convergence. The incomplete Cholesky factorization is represented in the following equation:

$$M = PLDL^T P^T = A - R, \qquad 5)$$

wherein P is a permutation matrix, L is the lower triangular with unit diagonal elements, D is diagonal, and R is a remainder matrix.

Modified successive over-relaxation or mSOR is another preconditioner that may be alternatively or additionally used for the iterative conjugate gradient method to achieve faster convergence. The preconditioner mSOR is a two parametric method that weights the diagonal of the positive-definite matrix. Consider the matrix, A, in the following form:

$$A = \begin{pmatrix} D_1 & M \\ N & D_2 \end{pmatrix}, \qquad 6)$$

where $D_1$ and $D_2$ are square non-singular matrices. This may be rewritten as:

$$A_0 = \begin{pmatrix} \frac{1}{\omega}D_1 & M \\ N & \frac{1}{\omega'}D_2 \end{pmatrix}, \qquad 7)$$

where $\omega$ is used for the equations corresponding to $D_1$ and $\omega'$ is used for the equations corresponding to D2. Therefore, the iteration matrix $B(\omega, \omega')$ is defined by:

$$B(\omega, \omega') = A_0^{-1} A_1 = \begin{pmatrix} (1-\omega)I_1 & \omega F \\ \omega'(1-\omega)G & \omega\omega' GF + (1-\omega')I_2 \end{pmatrix}, \qquad 8)$$

where $F = -D_1^{-1} M$ and $G = -D_2^{-1}$.

In step 148, a determination is made as to whether convergence has been achieved in the non-Fourier heat conduction numerical analysis performed in step 146. If the numerical analysis has converged to a solution, then the results are generated and the process ends in step 150. However, if convergence has not occurred, then a determination is made as to whether the assumptions made about the boundary conditions or the 3D circuit geometry are incorrect or should be modified in step 152. If the assumptions about the 3D circuit geometry should be modified, then the process proceeds to step 154 to revise one or more of these assumptions. The revised 3D geometry assumptions are provided to step 144 where the 3D solid modeling is performed, and execution then proceeds to step 146 for the numerical analysis. Alternatively, a determination may be made that boundary conditions should be modified, and in step 156 the boundary conditions are revised, and the revised boundary conditions are provided to step 146 to perform the heat conduction numerical analysis. This process is repeated until a convergence to a solution has been achieved.

The solution from the process described above and shown in FIG. 3 is a set of data that is indicative of one or more locations in the 3D circuit geometry where thermal damage may occur in response to the given excitation. The physical spatial location or site of high ampacity risk may be provided in the form of (x, y, z) coordinates that map to a point in the 3D circuit geometry or solid model. Another set of data provided by method 140 is the heat dissipation intensity at all points in the circuit geometry. An exemplary plot may be generated by method 140 of the solution data, such as one with the physical spatial location (x, y, z) of the location on the x-axis and the heat dissipation intensity in degrees Celsius on the y-axis.

Accordingly, the embodiments described herein may be incorporated into a design cycle of any system having one or more electrical circuits embodied in a printed circuit board. The system and method described herein are operable to reliably analyze the ampacity of a DC net under DC and AC transient pulse excitation, and therefore identify locations of ampacity risk. A numerical analysis method using incomplete Cholesky conjugate gradient and optionally modified successive over-relaxation scheme is described herein to converge on a solution given assumptions on the 3D circuit geometry, the boundary conditions, and the excitation to the circuit.

Although illustrative embodiments have been shown and described, a wide range of modification, change and substitution is contemplated in the foregoing disclosure and in some instances, some features of the embodiments may be employed without a corresponding use of other features.

Accordingly, it is appropriate that the appended claims be construed broadly and in a manner consistent with the scope of the embodiments disclosed herein.

What is claimed is:

1. A computer-readable medium comprising computer-readable instructions for determining ampacity risks in a circuit, when executed by a computer causing the computer to:
   receive geometry data of the circuit;
   initialize boundary conditions;
   initialize circuit geometry assumptions;
   model the circuit geometry data as a three-dimensional solid;
   compute non-Fourier heat conduction through the three-dimensional solid model using conjugate gradient numerical analysis with an incomplete Cholesky preconditioner; and
   generate an output indicative of a location in the three-dimensional solid model where potential thermal damage may occur in response to a predetermined excitation wherein generating an output comprises generating an output in response to a transient aperiodic excitation.

2. The computer-readable medium of claim 1, wherein computing non-Fourier heat conduction comprises using conjugate gradient numerical analysis with an incomplete Cholesky preconditioner and a modified successive over-relaxation preconditioner.

3. The computer-readable medium of claim 1, wherein receiving geometry data of the circuit comprises receiving circuit layout data.

4. The computer-readable medium of claim 1, wherein initializing boundary conditions comprises making an assumption regarding heat leakage at circuit boundaries.

5. The computer-readable medium of claim 1, wherein initializing boundary conditions comprises making an assumption about the external temperature.

6. The computer-readable medium of claim 1, wherein initializing circuit geometry assumptions comprises making an assumption whether a substrate of the circuit is isotropic.

7. The computer-readable medium of claim 1, wherein initializing circuit geometry assumptions comprises making an assumption whether electrical conductivity and resistivity is a function of temperature.

8. The computer-readable medium of claim 1, further comprising:
   determining whether the non-Fourier heat conduction computation has converged on a solution;
   revising at least one of a boundary condition and circuit geometry assumptions in response to the computation not converging on a solution; and
   computing the non-Fourier heat conduction using the at least one revised assumption.

9. The computer-readable medium of claim 1, wherein receiving geometry data of the circuit comprises receiving geometry data of a printed circuit board layout.

10. The computer-readable medium of claim 1, wherein generating an output comprises generating an output in response to a static DC excitation.

11. A computer-readable medium comprising computer-readable instructions for determining ampacity risks in a printed circuit board layout, when executed by a computer, causing the computer to:
    receive geometry data of the printed circuit board layout;
    initialize boundary conditions;
    initialize circuit geometry assumptions;
    model the circuit geometry data as a three-dimensional solid;
    compute non-Fourier heat conduction through the three-dimensional solid model using conjugate gradient numerical analysis with a preconditioner;
    determine whether the computation has converged on a solution; and
    generate an output, in response to convergence on a solution, indicative of a location in the three-dimensional solid model where potential thermal damage may occur in response to a predetermined excitation, wherein generating an output comprises generating an output in response to a transient aperiodic excitation.

12. The computer-readable medium of claim 11, wherein computing non-Fourier heat conduction comprises using conjugate gradient numerical analysis with an incomplete Cholesky preconditioner and a modified successive over-relaxation preconditioner.

13. The computer-readable medium of claim 11, wherein initializing boundary conditions comprises making an assumption regarding surface conditions of the three-dimensional solid model.

14. The computer-readable medium of claim 11, wherein initializing boundary conditions comprises making an assumption about initial temperature.

15. The computer-readable medium of claim 11, wherein initializing circuit geometry assumptions comprises making an assumption whether a via of the circuit is homogeneous.

16. The computer-readable medium of claim 11, wherein initializing circuit geometry assumptions comprises making an assumption whether electrical conductivity and resistivity is a function of temperature.

17. The computer-readable medium of claim 11, wherein computing non-Fourier heat conduction comprises solving a partial differential equation of hyperbolic type.

18. The computer-readable medium of claim 11, further comprising:
    revising at least one of a boundary condition and circuit geometry assumptions in response to the computation not converging on a solution; and
    computing the non-Fourier heat conduction using the at least one revised assumption.

* * * * *

UNITED STATES PATENT AND TRADEMARK OFFICE
CERTIFICATE OF CORRECTION

| | | |
|---|---|---|
| PATENT NO. | : 7,596,482 B2 | Page 1 of 1 |
| APPLICATION NO. | : 11/440536 | |
| DATED | : September 29, 2009 | |
| INVENTOR(S) | : Rajen J. Murugan et al. | |

It is certified that error appears in the above-identified patent and that said Letters Patent is hereby corrected as shown below:

Title Page (75) Inventors: delete "Sarat Kirshnan" and insert --Sarat Krishnan--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,596,482 B2 |
| APPLICATION NO. | : 11/440536 |
| DATED | : September 29, 2009 |
| INVENTOR(S) | : Murugan et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 701 days.

Signed and Sealed this

Twenty-eighth Day of September, 2010

David J. Kappos
*Director of the United States Patent and Trademark Office*